United States Patent
Miyazaki et al.

(10) Patent No.: US 8,428,845 B2
(45) Date of Patent: Apr. 23, 2013

(54) VEHICLE CONTROL APPARATUS

(75) Inventors: Tsutomu Miyazaki, Miyoshi (JP); Toshiya Oishi, Nagoya (JP); Masashi Takagi, Nagoya (JP); Michihito Shimada, Mishima (JP); Yuki Minase, Susono (JP); Kenichi Okaya, Susono (JP); Hiroyuki Hanamura, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/383,732

(22) PCT Filed: Dec. 28, 2009

(86) PCT No.: PCT/JP2009/007335
§ 371 (c)(1),
(2), (4) Date: Jan. 12, 2012

(87) PCT Pub. No.: WO2011/080797
PCT Pub. Date: Jul. 7, 2011

(65) Prior Publication Data
US 2012/0116650 A1 May 10, 2012

(51) Int. Cl.
*G06F 19/00* (2011.01)
(52) U.S. Cl.
USPC ............... 701/101; 701/90; 701/93; 701/103; 701/115
(58) Field of Classification Search .................. 701/101, 701/105, 106, 103, 115, 70, 90, 93
See application file for complete search history.

(56) References Cited

U.S. PATENT DOCUMENTS

| | | | | |
|---|---|---|---|---|
| 2010/0121550 A1* | 5/2010 | Inoue et al. | | 701/94 |
| 2012/0259524 A1* | 10/2012 | Miyazaki et al. | | 701/70 |
| 2012/0271526 A1* | 10/2012 | Oishi et al. | | 701/99 |
| 2012/0290179 A1* | 11/2012 | Oishi et al. | | 701/54 |
| 2012/0290188 A1* | 11/2012 | Oishi et al. | | 701/99 |

FOREIGN PATENT DOCUMENTS

| | | |
|---|---|---|
| JP | 62 51737 | 3/1987 |
| JP | 64 21026 | 2/1989 |
| JP | 2593092 | 12/1996 |
| JP | 2005 291030 | 10/2005 |

OTHER PUBLICATIONS

International Search Report Issued Jan. 26, 2010 in PCT/JP09/07335 Filed Dec. 28, 2009.

* cited by examiner

*Primary Examiner* — John Kwon
(74) *Attorney, Agent, or Firm* — Oblon, Spivak, McClelland, Maier & Neustadt, L.L.P.

(57) ABSTRACT

Provided is a vehicle control apparatus which can prevent drivability from being deteriorated. The vehicle control apparatus comprises an ECU adapted to determine whether or not a brake is "off" or the state of the hysteresis width of an accelerator opening degree exceeding a predetermined hysteresis width is continued for a predetermined period of time during the execution of an engine torque reduction control process. When the ECU determines that the brake is "off" or that the state of the hysteresis width of an accelerator opening degree exceeding a predetermined hysteresis width is continued for a predetermined period of time, the ECU performs an engine torque restoration process of the engine. Therefore, the vehicle control apparatus can allow the continued execution and non-execution of the reduction control to be switched therebetween in accordance with the driver's travel intention, thereby making it possible to prevent the drivability from being deteriorated.

18 Claims, 6 Drawing Sheets

FIG.4

|   |      | C1 | C2 | B1 | B2 | B3 | F |
|---|------|----|----|----|----|----|---|
|   | P    | ×  | ×  | ×  | ×  | ×  | × |
|   | R    | ×  | ×  | ×  | ○  | ○  | × |
|   | N    | ×  | ×  | ×  | ×  | ×  | × |
| D | 1st  | ○  | ×  | ×  | ◎  | ×  | △ |
| D | 2nd  | ○  | ×  | ○  | ×  | ×  | × |
| D | 3rd  | ○  | ×  | ×  | ×  | ○  | × |
| D | 4th  | ○  | ○  | ×  | ×  | ×  | × |
| D | 5th  | ×  | ○  | ×  | ×  | ○  | × |
| D | 6th  | ×  | ○  | ○  | ×  | ×  | × |

○ ENGAGEMENT × DISENGAGEMENT
◎ ENGAGEMENT ONLY AT THE TIME OF APPLYING ENGINE BRAKE
△ ENGAGEMENT AT THE TIME OF STARTING VEHICLE

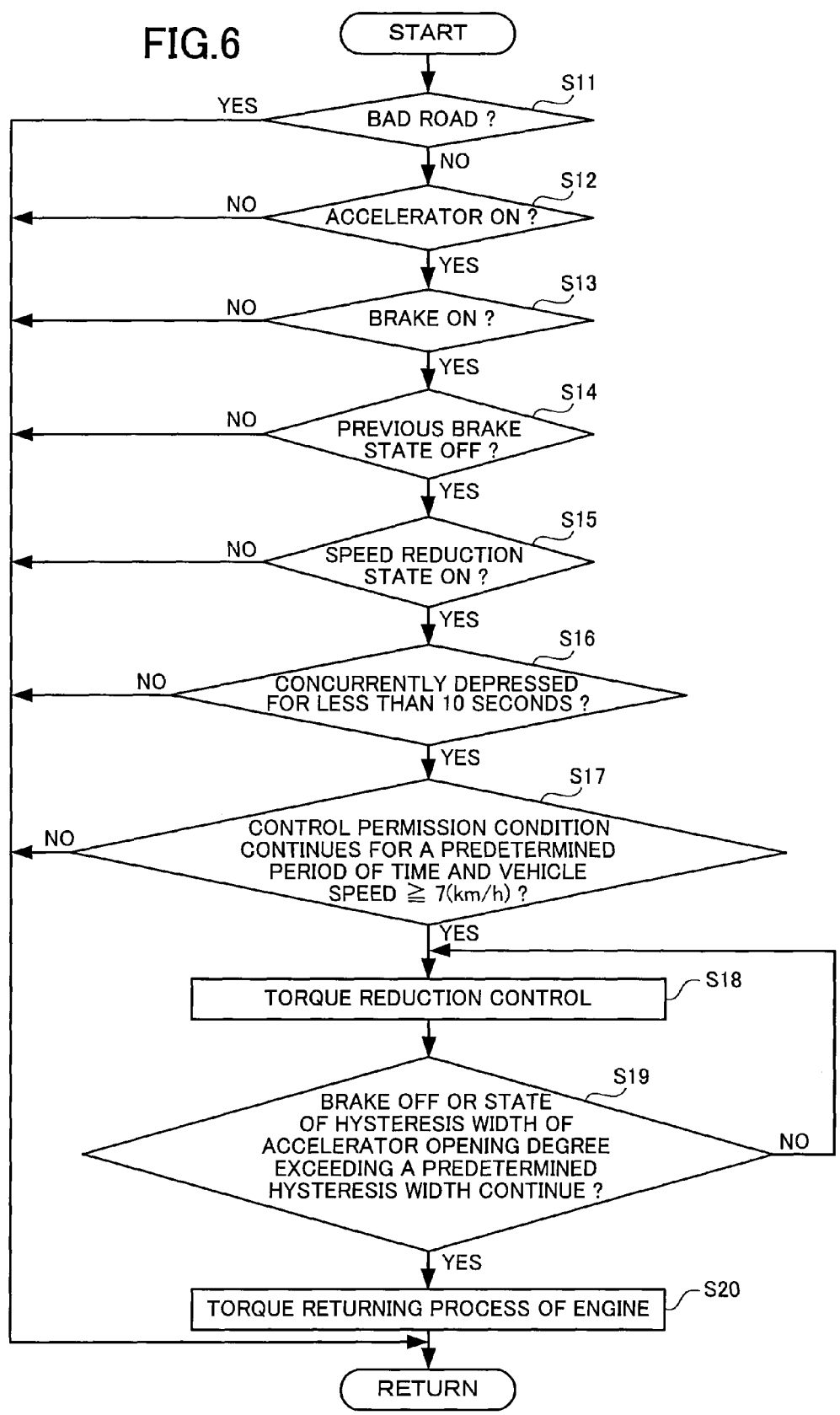

VEHICLE CONTROL APPARATUS

TECHNICAL FIELD

The present invention relates to a vehicle control apparatus, and more particularly to a vehicle control apparatus for performing the reduction control of the output of a drive source.

BACKGROUND ART

In general, a vehicle has three basic, necessary abilities including a "driving force" as an ability of "advancing", a "steering force" as an ability of "turning", and a "braking force" as an ability of "stopping".

The "driving force" is a power, i.e., a torque generated by a power source of an internal combustion engine (hereinafter simply referred to as "engine") in response to an amount of depression of an accelerator pedal and transmitted through a transmission to driving wheels. The "driving force" is thus obtained as a reaction force against the frictional force of the driving wheels and a road surface allowing the driving wheels to travel thereon. The "steering force" is obtained by a steering device capable of changing the advancing direction of, for example, front wheels in response to the operation amount of a steering wheel. The "braking force" is generated in response to the amount of depression of a brake pedal by slowing down or stopping the rotations of the driving wheels to generate a frictional force of the driving wheels and the road surface.

In general, the accelerator pedal and the brake pedal are located in the neighborhood of the positions of the driver's feet. Many drivers depress selectively the accelerator pedal or the brake pedal only with his right foot to control the "driving force" and the "braking force", viz., to control a vehicle speed.

In that case, for example, a vehicle with an automatic transmission (hereinafter simply referred to as "AT car") is provided with no clutch pedal, thereby causing some drivers to drive his or her car while depressing the brake pedal with his or her left foot and depressing the accelerator pedal with his or her right foot. In this way, there are some drivers who drive their cars separately using their left foot and right foot to depress the brake pedal and the accelerator pedal, respectively. For such drivers separately using both their feet for depressing the brake pedal and the accelerator pedal, there is a possible case in that the brake pedal is depressed while the accelerator pedal is not being released by the driver or the accelerator pedal is depressed while the brake pedal is not being released by the driver.

Thus, the concurrent depressions of the accelerator pedal and the brake pedal are apt to lead to deterioration in drivability.

There has so far been known a vehicle control apparatus which can reduce an engine torque in the event that the accelerator pedal and the brake pedal are depressed at the same time (see, for example, Patent Document 1).

The previously mentioned conventional vehicle is constructed to reduce the torque outputted by the engine with the fuel injection amount of the engine being temporarily reduced in the case that the accelerator pedal and the brake pedal are depressed at the same time.

Citation List
Patent Literature
PTL 1: Japanese Patent Publication No. S62-051737

SUMMARY OF INVENTION

Solution to Problem

However, the conventional vehicle control apparatus previously mentioned is constructed to reduce the fuel injection amount and thereby reduce the torque irrespective of the vehicle travelling state when the accelerator pedal and the brake pedal are depressed by the driver at the same time. This means that the torque is reduced irrespective of the driver's intention with the driver's concurrent depressions of the accelerator pedal and the brake pedal. For this reason, in the event that the accelerator pedal and the brake pedal are depressed at the same time, there is caused a hesitation and other unfavorable phenomenon on the vehicle, thereby leading to problems such as deteriorated drivability.

The present invention has been made to solve such conventional problems. It is therefore an object of the present invention to provide a vehicle control apparatus which can prevent the deterioration of the drivability.

Solution to Problem

In order to solve the above problems, (1) a vehicle control apparatus according to the present invention for a vehicle provided with a drive source, an accelerator pedal, and a brake pedal, comprises: a drive state detection means for detecting a drive state of the vehicle including a drive force requested amount of a drive force outputted by the drive source; an output control means for executing a reduction control to reduce the drive force outputted by the drive source for the drive force requested amount; a permission condition determination means for determining whether or not a permission condition to permit execution of the reduction control is established; a termination condition determination means for determining whether or not a termination condition to terminate the execution of the reduction control is established; and a travel intention estimation means for estimating whether or not a driver has a travel intention based on the drive state of the vehicle detected by the drive state detection means during the execution of the reduction control; in which the drive state detection means has an accelerator detection means for detecting a depression amount of the accelerator pedal, and a brake detection means for detecting depression of the brake pedal, the permission condition determination means is operative to determine the establishment of the control permission condition when the depression of the accelerator pedal is detected by the accelerator detection means, and the depression of the brake pedal is detected by the brake detection means, the travel intention estimation means is operative to estimate whether or not the driver has a travel intention to travel the vehicle based on the depression amount of the accelerator pedal or the varied depression of the brake pedal detected by the drive state detection means, the termination condition determination means is operative to determine the establishment of the control termination condition when the travel intention estimation means estimates that the driver has the travel intention, and the output control means is operative to execute the reduction control when the establishment of the control permission condition is determined by the permission condition determination means, and to terminate the reduction control when the establishment of the control termination condition is determined by the termination condition determination means.

By the construction of the vehicle control apparatus previously mentioned, the vehicle control apparatus can perform the reduction control of the driving force of the driving source at the time of the accelerator pedal and the brake pedal concurrently depressed being detected, and can finish the reduction control when the depression amount of the accelerator pedal or the depression of the foot brake pedal is varied during the executed reduction control, so that it is possible to change the execution and no-execution of the reduction control with the consciousness of the driver, and thus to prevent the drivability from being deteriorated.

The vehicle control apparatus according to the invention as set forth in the above description (1), (2) further comprises an accelerator opening degree memorization means for memorizing as a starting time accelerator opening degree the depression amount of the accelerator pedal when the reduction control starts to be executed by the output control means, and in which the travel intention estimation means is operative to estimate that the driver has the travel intention when the depression amount of the accelerator pedal detected by the accelerator detection means is varied to exceed a set change amount of accelerator opening degree as compared with the starting time accelerator opening degree.

By the construction of the vehicle control apparatus previously mentioned, when the depression amount of the accelerator pedal is varied to exceed the set change amount of accelerator opening degree with respect to the depression amount of the accelerator pedal at the time of starting the execution of the reduction control, it can be estimated that the driver has the travel intention. This makes it possible to prevent the reduction control from abruptly being finished to the depression amount of the accelerator pedal varied without his or her intention.

In the vehicle control apparatus according to the invention as set forth in the above description (2), (3) the travel intension estimation means is operative to estimate that the driver has the travel intention when the depression amount of the accelerator pedal detected by the accelerator detection means is increased over the set change amount of accelerator opening degree from the starting time accelerator opening degree.

By the construction of the vehicle control apparatus previously mentioned, when the depression amount of the accelerator pedal is increased to exceed the set change amount of accelerator opening degree from the starting time accelerator opening, it can be estimated that the driver has the travel intention. This makes it possible to rapidly finish the reduction control when the driver depresses the accelerator pedal while driving the vehicle and thus to prevent the drivability from being deteriorated.

In the vehicle control apparatus according to the invention as set forth in the above description (2) or (3), (4) the termination condition determination means is operative to determine that the control termination condition is established when the depression amount of the accelerator pedal detected by the accelerator detection means is decreased over the set change amount of accelerator opening degree from the starting time accelerator opening degree.

By the construction of the vehicle control apparatus previously mentioned, when the depression amount of the accelerator pedal is decreased to exceed the set change amount of accelerator opening degree from the starting time accelerator opening, it is determined that the driver has the travel intention. This makes it possible to rapidly finish reduction control, viz., the unnecessary reduction control with the driver's consciousness being reflected when the driver releases and thus returns the accelerator pedal to its home position, and thus to prevent the drivability from being deteriorated.

In the vehicle control apparatus according to the invention as set forth in any one of the above descriptions (2) to (4), (5) the travel intension estimation means is operative to estimate that the driver has the travel intention when the time period lasts over a predetermined time with the depression amount of the accelerator pedal detected by the accelerator detection means being varied over the set change amount of accelerator opening degree as compared with the starting time accelerator opening degree.

By the construction of the vehicle control apparatus previously mentioned, when the depression amount of the accelerator pedal is varied to exceed the set change amount of accelerator opening degree as compared with the starting time accelerator opening, and the depressed state of the accelerator pedal lasts for a time period more than the set time period, it is determined that the driver has the travel intention. This makes it possible to improve the certainty of the driver's consciousness with the lasting depressed state, i.e., the lasting depressed time of the accelerator pedal, and to prevent the reduction control from being rapidly finished with respect to the depression amount of the accelerator pedal varied without the driver's consciousness, and thus to prevent the drivability from being deteriorated.

In the vehicle control apparatus according to the invention as set forth in any one of the above descriptions (1) to (5), (6) the travel intension estimation means is operative to estimate that the driver has the travel intention when the brake pedal not depressed is detected by the brake detection means.

By the construction of the vehicle control apparatus previously mentioned, the vehicle control apparatus can estimate that the driver has the vehicle travel intention when detecting the foot brake pedal not being depressed. This makes it possible to rapidly finish reduction control and to output the desired torque when the foot brake pedal is released from being depressed, and thus to prevent the drivability from being deteriorated.

The vehicle control apparatus according to the invention as set forth in any one of the above descriptions (1) to (6), (7) further comprises a bad road travel determination means for determining whether or not the vehicle is travelling on bad roads based on the drive state detected by the drive state detection means, and in which the permission condition determination means is operative to determine that the control permission condition is not established when the bad road travel determination means determines that the vehicle is travelling on the bad roads, and the output control means is operative not to execute the reduction control when the permission condition determination means determines that the control permission condition is not established.

By the construction of the vehicle control apparatus previously mentioned, the vehicle control apparatus does not allow the reduction control to be executed in the case of the vehicle being determined to travel on a bad road, so that the vehicle can travel without decreasing the torque outputted from the engine even if the accelerator pedal and the foot brake pedal are concurrently depressed while the vehicle is travelling on a bad road having a high possibility of the accelerator pedal and the foot brake pedal being concurrently depressed unintentionally. Therefore, at the time of the vehicle being travelling on a normal road, the torque from the engine can be decreased in the case that the accelerator pedal and the foot brake pedal are concurrently depressed by the driver, while, at the time of the vehicle being travelling on a bad road, the torque requested by the driver is generated by the engine, thereby making it possible to prevent the drivability from being deteriorated.

In the vehicle control apparatus according to the invention as set forth in any one of the above descriptions (1) to (7), (8) the permission condition determination means is operative to determine that the control permission condition is established when the depression of the brake pedal is detected by the brake detection means in the state that the depression of the accelerator pedal is detected by the accelerator detection means.

By the construction of the vehicle control apparatus previously mentioned, the vehicle control apparatus can decrease the driving force outputted from the drive source when the foot brake pedal is detected as being depressed in the state of the accelerator pedal being depressed due to the fact that the vehicle is in the state that the driver requests the braking operation of the vehicle when the foot brake is depressed after the accelerator pedal is in the state of being depressed.

In the vehicle control apparatus according to the invention as set forth in any one of the above descriptions (1) to (8), (9) the drive state detection means has a vehicle speed detection means for detecting a vehicle speed, and the output control means is operative to execute the reduction control when the vehicle speed detection means detects that the detected vehicle speed is over a predetermined vehicle speed.

By the construction of the vehicle control apparatus previously mentioned, the vehicle control apparatus can perform the driving force reduction control when the vehicle speed exceeds the preliminarily set vehicle speed, while the driving force reduction control is not executed in order to respond the hill start and others of the vehicle. This makes it possible to prevent the drivability from being deteriorated while the necessary torque is transmitted.

In the vehicle control apparatus according to the invention as set forth in any one of the above descriptions (1) to (9), (10) the output control means is operative to execute the reduction control when the permission condition determination means determines that the control permission condition lasting in a preliminarily set time period is established.

By the construction of the vehicle control apparatus previously mentioned, the vehicle control apparatus can perform the reduction control when the control permission condition is being established for a preliminarily set lasting time period, so that the reduction control can be prevented from rapidly being performed, thereby making it possible to prevent the drivability from being deteriorated.

Advantageous Effects of Invention

According to the present invention, the execution or non-execution of the reduction control of the engine torque can be carried out taking the driver's travel intention, thereby making it possible to prevent the drivability from being deteriorated.

BRIEF DESCRIPTION OF DRAWINGS

FIG. 4 is a table showing the engagement state of frictional engagement elements to realize each shift stage in the embodiment of the present invention.

FIG. 6 is a flowchart showing a vehicle control processing in the embodiment of the present invention.

DESCRIPTION OF EMBODIMENTS

The preferred embodiments according to the invention will be described hereinafter with reference to the accompanying drawings.

First, the construction of a vehicle having a control apparatus according to the embodiment of the present invention will be described with reference to the schematic block diagram of the vehicle shown in FIG. 1 and the schematic block diagram of the vehicle control shown in FIG. 2.

Figure 1:
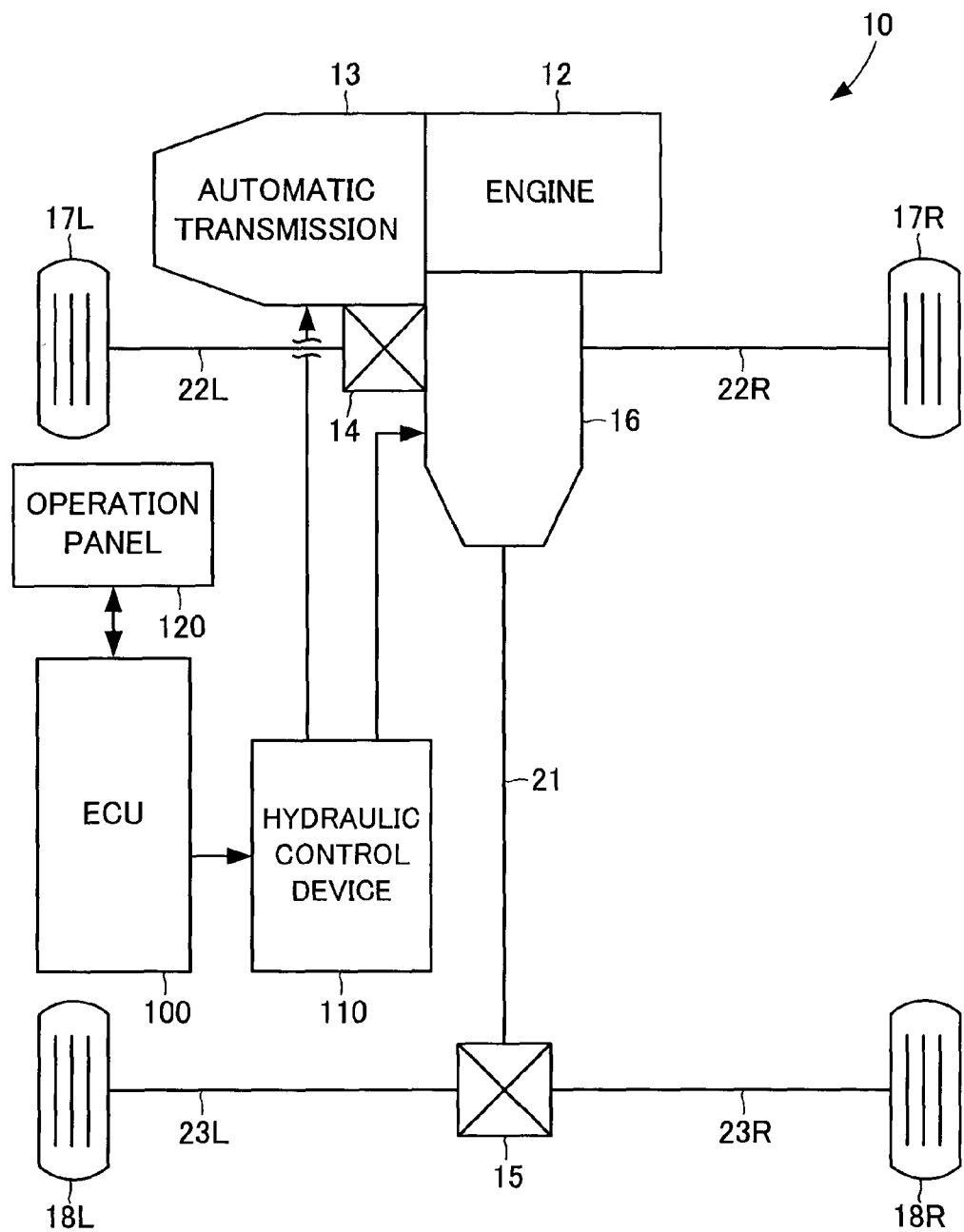
FIG. 1 is a schematic block diagram of a vehicle equipped with a control apparatus according to an embodiment of the present invention.
Figure 2:
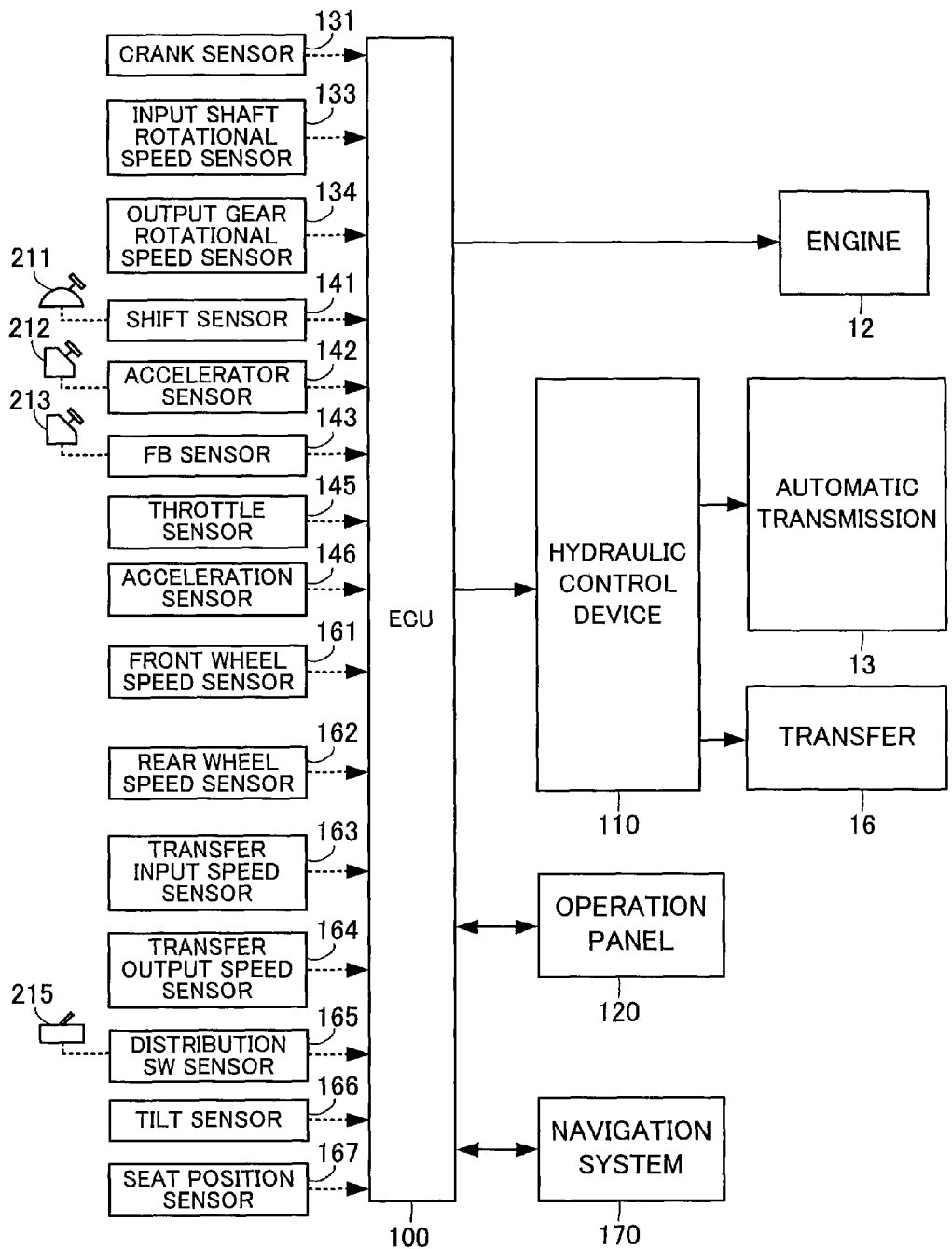
FIG. 2 is a schematic block diagram of the vehicle control according to the embodiment of the present invention.

As shown in FIG. 1, a vehicle 10 according to the embodiment comprises an engine 12 serving as a power source, an automatic transmission 13 for transmitting a torque generated by the engine 12 and for forming transmission stages responding to the travel conditions of the vehicle 10, a front differential mechanism 14 for distributing the torque transmitted from the automatic transmission 13 to left and right front drive shafts 22L, 22R, a rear differential mechanism 15 for distributing the torque transmitted by a propeller shaft 21 to left and right rear drive shafts 23L, 23R, and a transfer 16 for distributing the torque transmitted by the automatic transmission 13 to front wheels 17L, 17R and rear wheels 18L, 18R.

Further, the vehicle 10 comprises an ECU (Electronic Control Unit) 100 serving as a vehicle electronic control unit for controlling the entire vehicle 10, a hydraulic control device 110 for hydraulically controlling the automatic transmission 13 and the transfer 16, an operation panel 120 serving as an input/output interface with the driver, and a navigation system 170.

Further, the vehicle 10 is provided with a crank sensor 131, an input shaft rotational speed sensor 133, an output gear rotational speed sensor 134, a shift sensor 141, an accelerator sensor 142, a foot brake sensor 143 (hereinafter referred to as "FB sensor"), a throttle sensor 145, an acceleration sensor 146, a front wheel speed sensor 161, a rear wheel speed sensor 162, a transfer input speed sensor 163, a transfer output speed sensor 164, a distribution SW sensor 165, a tilt sensor 166, a seat position sensor 167, and the various kinds of other sensors not shown in the drawings. The previously mentioned sensors are adapted to output their detection signals to the ECU 100.

An ordinary vehicle and a low-priced car may not be provided with all of the sensors 131 to 167, and some of those sensors 131 to 167 are not always necessary for the vehicle and the car in the present invention. For example, as will be discussed below, such as the acceleration sensor 146, the function of a sensor can be substituted by other sensors, or a similar control can be achieved by the value detected by the other sensors. Thus, the vehicle 10 may not be equipped with the sensors that can be substituted by the other sensors. In the present embodiment, those previously mentioned sensors not generally provided to the ordinary vehicles and the general economy car are raised for explaining hereinafter their respective processes according to the invention. The alternative processing by the other sensors will be discussed later.

The engine 12 is constituted by a known power device which can output torque by combusting in a combustion chamber of a cylinder not shown a mixture of hydrocarbon fuel such as gasoline or diesel and air. The engine 12 is operated to intermittently repeat the actions of taking in the air mixture into the combustion chamber of the cylinder, combusting the mixture in the cylinder, and discharging exhaust gas to the outside of the cylinder to reciprocate a piston in the cylinder to enable a crank shaft drivably coupled to the piston to be rotated, thereby transmitting the torque to the automatic transmission 13. The fuel to be used for the engine 12 may be an alcohol fuel including an alcohol such as ethanol.

The automatic transmission 13 includes a plurality of planetary gear devices each provided with a plurality of friction engagement elements constituted by clutches and brakes and operative to be selectively engaged or disengaged, thereby forming a plurality of transmission stages in response to the combination of the engagement and disengagement of the clutches and the brakes. The clutches and the brakes are constructed to be switched selectively into their engaged states or their disengaged states by the hydraulic control device 110.

By this construction, the automatic transmission 13 functions as a staged transmission to reduce or increase the torque or rotation of the crank shaft of the engine 12 inputted as a driving force at a given speed change ratio γ to be outputted to the front differential mechanism 14 and the transfer 16. This means that the automatic transmission 13 constitutes a plurality of speed change stages operable in response to the vehicle travel states and thus can carry out a speed conversion in response to the speed change stages. The detailed explanation about the automatic transmission 13 will be described hereinafter. The automatic transmission 13 may be composed of a continuously variable transmission by continuously changing the transmission speed change ratio.

The front differential mechanism 14 is operative to allow the rotational speed to be different between the front wheels 17R and 17L when the vehicle is travelling through a curved road. The front differential mechanism 14 comprises a plurality of gears to distribute and output the torque inputted by the automatic transmission 13 to the front drive shafts 22L, 22R. The front differential mechanism 14 may be constructed to have the front drive shafts 22L, 22R rotated at the same rotational speed, and thus may be operated under a diff-locked state having no difference in rotational speed between the front wheels 17L, 17R. The detailed explanation about the front differential mechanism 14 will be described hereinafter.

The rear differential mechanism 15 is substantially the same in construction as the front differential mechanism 14, so that the explanation about the rear differential mechanism 15 will be omitted hereinafter.

The transfer 16, also known as an auxiliary transmission, serves to distribute and transmit to the front differential mechanism 14 and the rear differential mechanism 15 the torque transmitted by the automatic transmission 13. This means that the torque transmitted by the automatic transmission 13 can be distributed and transmitted by the transfer 16 to the front wheels 17L, 17R and the rear wheels 18L, 18R.

The vehicle 10 in the present embodiment is exemplified as a front-wheel driving vehicle at the time of a usual drive state in which the front wheels 17L, 17R serve as driving wheels, respectively, when a four-wheel drive state is not selected. The transfer 16 is thus operative in the usual drive state and the four-wheel drive state as described hereinafter. This means that the transfer 16 can be operated in the usual drive state to distribute and transmit the torque transmitted by the automatic transmission 13 only to the front differential mechanism 14, but not to the rear differential mechanism 15. Further, the transfer 16 can be operated in the four-wheel drive state to distribute and transmit the torque transmitted by the automatic transmission 13 to the front differential mechanism 14 and the rear differential mechanism 15. The detailed description about the transfer 16 will become apparent as the description proceeds.

The ECU 100 comprises a CPU (Central Processing Unit) as a central processing unit, a ROM (Read Only Memory) for storing therein fixed data, a RAM (Random Access Memory) for storing data therein temporarily, an EEPROM (Electrically Erasable and Programmable Read Only Memory) made of a rewritable non-volatile memory, and an I/O interface circuit, and is designed to carry out the overall control of the vehicle 10.

As will be stated below, the ECU 100 is connected to the crank sensor 131, the accelerator sensor 142, and the other sensors. The ECU 100 is adapted to receive detection signals outputted from these sensors and to detect an engine speed Ne, an accelerator opening degree Acc, and others.

The ECU 100 has an internal clock capable of measuring time. Further, the ECU 100 is adapted to control the hydraulic control device 110 which can control the hydraulic pressure for the parts of the automatic transmission 13 and the transfer 16. However, the distinctive features of the ECU 100 will be described hereinafter.

In addition, the ROM of the ECU 100 is adapted to store therein an operating table to be used for realizing the transmission stages, and a program for performing the vehicle control as described hereinafter. Further, the ROM of the ECU 100 is adapted to store therein a throttle opening degree control map, a gear shifting diagram, a lock-up control map, and various other values of the vehicle 10 which will not be described hereafter.

Furthermore, the ROM of the ECU 100 is adapted to store therein an accelerator pedal depression determination value Acc_tv, a brake pedal depression determination value Bf_tv, a speed reduction brake determination value BfDc_tv, an output reducing accelerator opening degree Acn, and others as necessary.

The accelerator pedal depression determination value Acc_tv is indicative of a determination value for determining whether the vehicle 10 is under an accelerator-on state or an accelerator-off state in response to the depression amount of an accelerator pedal 212. The brake pedal depression determination value Bf_tv is indicative of a determination value for determining whether the vehicle 10 is under a brake-on state or a brake-off state in response to the depression amount of a foot brake pedal 213.

The speed reduction brake determination value BfDc_tv is indicative of a determination value for determining whether or not the vehicle 10 is in the reduced speed state in response to the depression amount of the foot brake pedal 213. The output reducing accelerator opening degree Acn is intended to indicate an accelerator opening degree for reducing the output of the engine 12 from the accelerator opening degree Acc in an actual state at the time of establishing a control permission condition to be described hereinafter.

The speed reduction brake determination value BfDc_tv and the output reducing accelerator opening degree Acn may be calculated in response to the travel state of the vehicle 10.

The hydraulic control device 110 comprises linear solenoid valves SLT, SLU, an on-off solenoid valve SL, and linear solenoid valves SL1 to SL5, each of which is constituted by an electromagnetic valve to be controlled by the ECU 100. The hydraulic control device 110 is adapted to be controlled by the ECU 100 to operate the above solenoid valves, so that the hydraulic circuit is switched and hydraulically controlled to operate the whole parts of the automatic transmission 13. Therefore, the hydraulic control device 110 is adapted to control the solenoid valves so that the solenoid valves can be switched to establish a desired speed change stage in the automatic transmission 13.

The operation panel 120 is operably connected with the ECU 100 to receive operational requests inputted by the driver, to perform operational assistances to the driver, and to display vehicle travel states and others. For example, when the driver inputs one of the travel modes using switches provided on the operation panel 120, the interface of the ECU 100 is inputted with the signal indicative of the travel mode inputted by the driver.

The navigation system 170 comprises a map information storage unit for storing information including topographic maps, a current position acquisition section using GPS (Global Positioning System) to acquire the current position of the vehicle 10, and a display section to display information to the driver, thereby acquiring the topographical information of the current position of the vehicle 10. The navigation system 170 is adapted to guide the driver from the current position to the destination in a similar manner to the car navigation systems known in the art.

The crank sensor 131 is adapted to detect the rotational speed of a crank shaft 24 while being controlled by the ECU 100 and to output a detection signal indicative of the rotational speed to the ECU 100. The ECU 100 is adapted to acquire as an engine speed Ne the rotational speed of the crank shaft 24 indicated by the detection signal outputted by the crank sensor 131.

The input shaft rotational speed sensor 133 is adapted to detect the rotational speed of an input shaft 71 described below under the control of the ECU 100 and to output a detection signal indicative of the rotational speed to the ECU 100. The input shaft 71 is directly connected with a turbine shaft 62 of a torque converter 60 described hereinafter. The input shaft 71 has a rotational speed the same as the rotational speed of the turbine shaft 62, so that an input shaft rotational speed Nm detected by the input shaft rotational speed sensor 133 is represented as a turbine rotational speed Nt.

The output gear rotational speed sensor 134 is adapted to detect the rotational speed of an output gear 72 described hereinafter under the control of the ECU 100 and to output a detection signal indicative of the detected rotational speed to the ECU 100.

In addition, the ECU 100 is adapted to be capable of calculating a speed change ratio $\gamma$ in accordance with the input shaft rotational speed Nm detected by the input shaft rotational speed sensor 133 and a rotational speed Nc detected by the output gear rotational speed sensor 134. Here, the "speed change ratio $\gamma$" is acquired by dividing the actual speed Nm of the input shaft 71 by the actual rotational speed Nc of the output gear 72.

The shift sensor 141 is controlled by the ECU 100, and adapted to detect any one of switched positions selected from among the switched positions to be taken by the shift lever 211 under the control of the ECU 100 and to output a detection signal indicative of the switched position taken by the shift lever 211 to the ECU 100.

Here, the shift lever 211 is constructed to take, from the rear side to the forward side of the vehicle 10, a D position indicative of a driving range (hereinafter simply referred to as "D range"), an N position indicative of a neutral range, an R position indicative of a reverse range, and a P position indicative of a parking range.

If the shift lever 211 is located in the D range, a transmission mechanism 70 can establish any one of the speed stages selected from among the first to sixth speed stages as described below. In this way, the ECU 100 can select any one of the speed stages from among the first to sixth speed stages in accordance with the vehicle speed V and a throttle opening degree $\theta$th.

The accelerator sensor 142 is operative under the control of the ECU 100, and adapted to detect the depression amount (hereinafter simply referred to as a "stroke") of the accelerator pedal 212 and to output a detection signal indicative of the detected stroke to the ECU 100 when the accelerator pedal 212 is depressed. In addition, the ECU 100 is adapted to calculate the accelerator opening degree Acc from the stroke of the accelerator pedal 212 indicated by the detection signal outputted from the accelerator sensor 142.

Therefore, the accelerator sensor 142 is adapted to detect the drive state of the vehicle 10, including the required amount of torque outputted by the engine 12. This means that the accelerator sensor 142 constitutes part of a drive state detection means. The accelerator sensor 142 is capable of detecting the depression of the accelerator pedal 212 and the amount of the depression of the accelerator pedal 212. This means that the accelerator sensor 142 constitutes an accelerator detection means.

The FB sensor 143 is operative under the control of the ECU 100, and adapted to detect the depression amount (hereinafter simply referred to as a "stroke") of the foot brake pedal 213 and to output the detection signal indicative of the detected stroke to the ECU 100 when the foot brake pedal 213 is depressed. In addition, the ECU 100 is adapted to calculate the brake pedal depression force Bf from the detected stroke of the foot brake pedal 213 indicated by the detection signal outputted from the FB sensor 143.

This means that the FB sensor 143 is adapted to detect the drive state of the vehicle 10. In other words, the FB sensor 143 constitutes part of the drive state detection means. In addition, the FB sensor 143 is adapted to detect the depression of the foot brake pedal 213 and the depression amount of the foot brake pedal 213. In other words, the FB sensor 143 constitutes a brake detection means.

In addition, the brake pedal depression force Bf indicative of the stroke of the foot brake pedal 213 detected by the FB sensor 143 may be replaced by a predetermined threshold value, i.e., the brake pedal depression determination value Bf_tv indicative of the stroke of the foot brake pedal 213. In this case, the FB sensor 143 can output a foot brake pedal on-off signal based on whether or not the stroke of the foot brake pedal 213 exceeds the previous predetermined threshold value.

In addition, the FB sensor 143 may be adapted to detect the hydraulic pressure in the hydraulic brake unit provided on each of the front wheels 17L, 17R, and to output a detection signal indicative of the detected hydraulic pressure of the hydraulic brake unit to the ECU 100. In this case, a predetermined threshold value is set for the hydraulic pressure of a brake cylinder forming part of each of the hydraulic brake units, the FB sensor 143 may output a foot brake pedal on-off signal based on whether or not the hydraulic pressure of the brake cylinder exceeds the previous predetermined threshold value.

The throttle sensor 145 is controlled by the ECU 100, and adapted to detect the opening degree of the throttle valve of the engine 12 driven by a throttle actuator not shown, and to output a detection signal indicative of the detected opening degree to the ECU 100. The ECU 100 is adapted to acquire as the throttle opening degree $\theta$th the throttle valve opening degree indicated by the detected signal outputted from the throttle sensor 145.

The ECU 100 can acquire the throttle opening degree $\theta$th from the accelerator opening degree Acc based on the throttle opening degree control map. This means that, without using the detected signal outputted from the throttle sensor 145, the throttle opening degree $\theta$th obtained from the above throttle opening degree control map can be substituted as a detected value. Here, in the case that the accelerator opening degree is changed to perform the reduction control of the output torque of the engine 12, the ECU 100 can acquire the throttle opening degree $\theta$th from the output reducing accelerator opening degree Acn.

The front wheel speed sensor 161 is adapted to detect the rotational speed of the front drive shaft 22L or 22R under the control of the ECU 100 and to output the detection signal indicative of the detected rotational speed to the ECU 100. Further, the ECU 100 is adapted to acquire as a drive shaft rotational speed Nd the rotational speed of the front drive shaft 22L or 22R indicated by the detection signal outputted by the front wheel speed sensor 161.

In addition, the ECU 100 is adapted to calculate the vehicle speed V based on the drive shaft rotational speed Nd obtained from the front wheel speed sensor 161. Therefore, the front wheel speed sensor 161 is adapted to detect the vehicle speed of the vehicle 10. This means that the front wheel speed sensor 161 constitutes a vehicle speed detection means. Here, the vehicle speed V represents a vehicle speed of the vehicle travelling on the normal travel roads, while the vehicle body speed Vr represents a vehicle speed of the vehicle travelling on the bad travel roads such as bumpy roads which cause the front wheels 17L and 17R to be slipped. The vehicle body speed Vr will be described hereinafter.

The rear wheel speed sensor 162 is operative under the control of the ECU 100, and adapted to detect the rotational speed of the rear drive shaft 23L or 23R and to output the detection signal indicative of the detected rotational speed to the ECU 100. Further, the ECU 100 is adapted to acquire as a rear wheel rotational speed Nr the rotational speed of the rear drive shaft 23L or 23R indicated by the detection signal outputted by the rear wheel speed sensor 162.

The ECU 100 is adapted to calculate the vehicle body speed Vr based on the rear wheel rotational speed Nr obtained from the rear wheel speed sensor 162 in the case that only the front wheels 17L, 17R are driven, viz., the front wheel drive mode is selected. Here, the rear wheels 18L, 18R are each constituted by a rolling wheel not driven by the engine 12, so that the detected rotational speeds of the rear wheels 18L, 18R enable to acquire the vehicle body speed Vr as an actual vehicle speed.

The transfer input speed sensor 163 is operative under the control of the ECU 100, and adapted to detect a rotational speed TRin of the input shaft of the transfer 16 and to output a detection signal indicative of the detected rotational speed to the ECU 100. More specifically, the ECU 100 is adapted to detect the rotational speed of an input shaft 54 of a transfer clutch 53 as will become apparent hereinafter.

The transfer output speed sensor 164 is operative under the control of the ECU 100, and adapted to detect a rotational speed TRout of an output shaft of the transfer 16, and to output a detection signal indicative of the detected rotational speed to the ECU 100. More specifically, the ECU 100 is adapted to detect the rotational speed of the propeller shaft 21.

The distribution SW sensor 165 is operative under the control of the ECU 100, and adapted to detect whether a power changing switch 215 assumes a two-wheel drive selection position or a four-wheel drive selection position, and to output a detected signal indicative of the changed position of the power changing switch 215 to the ECU 100. The power changing switch 215 may be constructed to be able to select a distribution ratio of the driving forces of the front wheels 17L, 17R and the rear wheels 18L, 18R in place of to select any one of the two-wheel drive mode and the four-wheel drive mode.

The tilt sensor 166 is controlled by the ECU 100, and adapted to detect the tilt angle of the vehicle 10 and to output the detection signal indicative of the detected tilt angle to the ECU 100. More specifically, the tilt sensor 166 has a weight supported by the vehicle 10 to swing in the forward, rearward, leftward, and rightward directions, so that the tilt sensor 166 can output to the ECU 100 a detection signal indicative of the displacement of the weight swung in response to the inclination of the vehicle 10 in the forward, rearward, leftward, or rightward direction.

The seat position sensor 167 is adapted to detect the position of the driver's seat to be seated by the driver under the control of the ECU 100, and to output a detection signal indicative of the detected position of the driver's seat to the ECU 100. Here, the present embodiment will be explained with the driver's seat having a smaller value at the position forward of the vehicle 10. Here, the position forward of the vehicle 10 is intended to indicate a position closer to the accelerator pedal 212, the foot brake pedal 213, and a steering wheel.

In addition, the ECU 100 is adapted to determine whether or not the vehicle 10 is travelling on a bad road based on the position of the driver's seat detected by the seat position sensor 167. More specifically, the ECU 100 determines that the vehicle 10 is travelling on a bad road when the value of the position of the driver's seat detected by the seat position sensor 167 is below a predetermined value of a bad road determination seat position, viz., the driver's seat taking a forwardly moved seat position, while the ECU 100 determines that the vehicle 10 is not travelling on a bad road when the value of the position of the driver's seat detected by the seat position sensor 167 is over the predetermined value of the bad road determination seat position.

Next, the construction of the automatic transmission 13 in the present embodiment will be described with reference to the schematic block diagram shown in FIG. 3.

Figure 3:
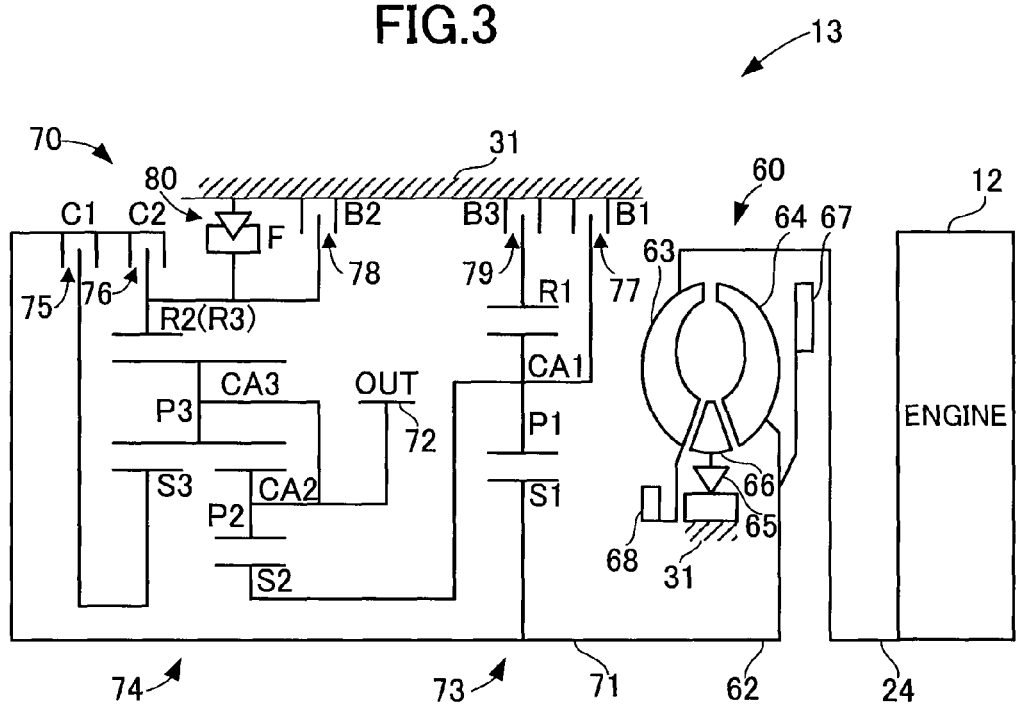
FIG. 3 is a schematic block diagram of an automatic transmission in the embodiment of the present invention.

As shown in FIG. 3, the automatic transmission 13 comprises a torque converter 60 for transmitting the torque outputted by the engine 12, and a transmission mechanism 70 for changing the rotational speed of the input shaft 71 serving as an input shaft and the rotational speed of the output gear 72 serving as an output shaft.

Between the transmission mechanism 70 and the front differential mechanism 14 is generally provided a reduction gear mechanism having the torque inputted by the transmission mechanism 70 to output the torque to the front differential mechanism 14 while reducing the rotational speed and increasing the driving force. For simplifying the explanation hereinafter, the vehicle 10 in the present embodiment will be described as being designed to directly transmit the torque to the front differential mechanism 14 from the transmission mechanism 70 without providing such a reduction gear mechanism.

The torque converter 60 is arranged between the engine 12 and the transmission mechanism 70, and comprises a pump impeller 63 inputted with the torque from the engine 12, a turbine runner 64 outputting the torque to the transmission mechanism 70, a stator 66 for changing the flow direction of oil, and a lock-up clutch 67 for directly connecting the pump impeller 63 with the turbine runner 64, so that the torque can be transmitted through the oil.

The pump impeller 63 is connected to the crank shaft 24 of the engine 12. The pump impeller 63 is designed to be rotated integrally with the crank shaft 24 by the torque of the engine 12.

The turbine runner 64 is connected to the turbine shaft 62 which is in turn connected to the transmission mechanism 70. The turbine shaft 62 is directly connected to the input shaft 71 of the transmission mechanism 70. The turbine runner 64 is rotated by the flow of the oil pressurized by the rotation of the pump impeller 63, and designed to output to the transmission mechanism 70 the rotation of the crank shaft 24 of the engine 12 through the turbine shaft 62.

The stator 66 is rotatably supported through a one-way clutch 65 by a housing 31 of the automatic transmission 13 constituting a non-rotating member. The stator 66 serves to change the directions in flow of the oil discharged from the turbine runner 64 and fed into the pump impeller 63 to generate a force to turn the pump impeller 63. The stator 66 is prevented from rotating by the one-way clutch 65 to change the direction of the oil flowing in the stator 66.

The stator 66 idles away to prevent a reverse torque from being applied to the turbine runner 64 when the pump impeller 63 and the turbine runner 64 come to be rotated at almost the same rotation speed.

The lock-up clutch 67 directly connects the pump impeller 63 and the turbine runner 64 to have the rotation of the crank shaft 24 of engine 12 mechanically transmitted directly to the turbine shaft 62.

Here, the torque converter 60 is adapted to transmit the torque through the oil between the pump impeller 63 and the turbine runner 64. Therefore, the rotation of the pump impeller 63 cannot transmit the torque by 100% to the turbine runner 64. For this reason, when the rotation speeds of the turbine shaft 62 and the crank shaft 24 become close to each other, the lockup clutch 67 is operated to mechanically and directly connect the pump impeller 63 and the turbine runner 64, more particularly, to mechanically and directly connect the crank shaft 24 to the turbine shaft 62 for more efficient transmission to the transmission mechanism 70 from the engine 12, thereby resulting in improving the fuel economy.

The lock-up clutch 67 is constructed to be able to realize a flex lock-up causing a slip at a predetermined slip ratio. The state of the lock-up clutch 67 is adapted to be selected by the CPU of the ECU 100 in response to the travel state of the vehicle 10, more specifically, the vehicle speed V and the accelerator opening degree Acc based on the lock-up control map stored in the ROM of the ECU 100. In addition, the state of the lock-up clutch 67 can, as described above, assume either one of a converter state having the lock-up clutch 67 released, a lock-up state having the lock-up clutch 67 coupled, and a flex lock-up state having the lock-up clutch 67 slipped.

In addition, the pump impeller 63 is provided with a mechanical type of oil pump 68 for generating hydraulic pressure for use in performing the transmission action of the transmission mechanism 70, and for supplying the oil to activate, lubricate and cool parts and elements.

The transmission mechanism 70 comprises the input shaft 71, the output gear 72, a first planetary gear 73, a second planetary gear 74, a C1 clutch 75, a C2 clutch 76, a B1 brake 77, a B2 brake 78, a B3 brake 79, and an F one-way clutch 80.

The input shaft 71 is directly connected to the turbine shaft 62 of the torque converter 60 so that the input shaft 71 can be directly inputted with the outputted rotation of the torque converter 60. The output gear 72 is connected with a carrier forming part of the second planetary gear 74 and is held in engagement with a differential ring gear 42 of the front differential mechanism 14 as will be described hereinafter, so that the output gear 72 can function as a counter drive gear. This means that the output gear 72 is adapted to transmit the outputted rotation of the transmission mechanism 70 to the front differential mechanism 14.

The first planetary gear 73 is constituted by a single pinion type of planetary gear mechanism. The first planetary gear 73 comprises a sun gear S1, a ring gear R1, a pinion gear P1, and a carrier CA1.

The sun gear S1 is coupled to the input shaft 71. The sun gear S1 is connected to the turbine shaft 62 of the torque converter 60 through the input shaft 71. The ring gear R1 is selectively fixed to the housing 31 of the automatic transmission 13 through the B3 brake 79.

The pinion gear P1 is rotatably supported by the carrier CA1. The pinion gear P1 is held in mesh with the sun gear S1 and the ring gear R1. The carrier CA1 is selectively fixed to the housing 31 of the automatic transmission 13 through the B1 brake 77.

The second planetary gear 74 is constituted by a ravigneaux type of planetary gear mechanism. The second planetary gear 74 thus comprises a sun gear S2, ring gears R2, R3, a short pinion gear P2, a long pinion gear P3, a sun gear S3, a carrier CA2, and a carrier CA3.

The sun gear S2 is connected with the carrier CA1 of the first planetary gear 73. The ring gears R2, R3 are selectively connected to the input shaft 71 through the C2 clutch 76. The ring gears R2, R3 are selectively fixed to the housing 31 through the B2 brake 78. The ring gears R2, R3 are blocked from being rotated in a rotation direction opposite (hereinafter simply referred to as an "opposite direction") to the rotation direction of the input shaft 71 by the F one-way clutch 80 provided in parallel with the B2 brake 78.

The short pinion gear P2 is rotatably supported by the carrier CA2. The short pinion gear P2 is held in mesh with the sun gear S2 and the long pinion gear P3. The long pinion gear P3 is rotatably supported by the carrier CA3. The long pinion gear P3 is held in mesh with the short pinion gear P2, the sun gear S3 and the ring gears R2, R3.

The sun gear S3 is selectively connected with the input shaft 71 through the C1 clutch 75. The carrier CA2 is connected with the output gear 72. The carrier CA3 is connected to the carrier CA2 and the output gear 72.

In addition, the B1 brake 77, the B2 brake 78, and the B3 brake 79 are fixed to the housing 31 of the automatic transmission housing 13. The C1 clutch 75, the C2 clutch 76, the F one-way clutch 80, the B1 brake 77, the B2 brake 78, and the B3 brake 79 (hereinafter simply referred to as "clutch C" and "brake B", respectively, as long as the above clutches and the above brakes are particularly not needed to be distinguished) are each constituted by a hydraulic type of friction engagement device having a multi-plate type of clutch or brake hydraulically activated and controlled by a hydraulic actuator. The clutch C and the brake B are changeable to assume the engagement state from the disengagement state and vice versa through the hydraulic circuit to be changed by the energization or de-energization of the linear solenoid valves SL1 to SL5, SLU, and SLT, and the on-off solenoid valve SL of the hydraulic control device 110 and by the operation of the manual valve not shown.

Next, the transmission mechanism 70 of the automatic transmission 13 in the present embodiment will be explained hereinafter with reference to the operating table shown in FIG. 4 while focusing on the engagement states of the frictional engagement elements to realize each of the transmission stages.

As shown in FIG. 4, the operating table to be used for realizing each of the transmission stages shows the engagement and disengagement states to be assumed by each of the frictional engagement elements of the transmission mechanism 70, viz., the clutches C and the brakes B to realize each of the transmission stages. In FIG. 4, the mark "○" (circle) is representative of the engagement, and the mark "x" (cross) is representative of the disengagement. The mark "⊙" (double circle) is representative of the engagement only at the time of applying an engine brake, and the mark "Δ" (triangle) is representative of the engagement at the time of starting the vehicle 10.

In accordance with the combination of the engagement and disengagement shown in the operating table, each of the frictional engagement elements are operated by the energization and de-energization or the electric current control of the linear solenoid valves SL1 to SL5 provided in the hydraulic control device 110 (see FIG. 1) and the transmission solenoids not shown to establish the first to sixth stages of the forward speed change stages and the rearward speed change stage.

In accordance with the operating table, the ECU 100 is operated to engage the F one-way clutch 80 in addition to the engagement of the C1 clutch 75 at the time of start driving the vehicle 10, for example, in the case of realizing the first speed stage. Further, the ECU 100 is operated to engage the B2 brake 79 in addition to the C1 clutch 75 at the time of applying the engine brake in the case of realizing the first speed stage.

For realizing the rearward speed change stage, the ECU 100 is operated to engage the B2 brake 78 and the B3 brake 79. Further, for realizing the neutral range and the parking range, the ECU 100 is operated to disengage all of the C1 clutch 75, the C2 clutch 76, the B1 brake 77, the B2 brake 78, the B3 brake 79, and the F one-way clutch 80. All of the disengagements of the frictional engagement elements of the transmission mechanism 70 cause the neutral state with no torque transmission between the input side and the output side to be established.

Next, the function about each of the solenoid valves of the hydraulic control device 110 will be explained hereinafter.

The linear solenoid valve SLT is adapted to perform the hydraulic control of the line pressure PL serving as an original hydraulic pressure of the oil to be supplied to the parts and the elements. More specifically, the linear solenoid valve SLT is controlled by the ECU 100 to adjust the line pressure PL on the basis of the throttle opening degree θth, an intake air amount Qar of the engine 12, a temperature Tw of the cooling water of the engine 12, the rotational speed Ne of the engine 12, the rotational speed Nm of the input shaft, i.e., the rotational speed of the turbine rotational speed Nt, a temperature Tf of the oil in the automatic transmission 13 and the hydraulic control device 110, shift positions Psh, shift ranges, and other parts.

The linear solenoid valve SLU is adapted to perform the lock-up control in the torque converter 60. More specifically, the linear solenoid valve SLU is controlled by the ECU 100 on the basis of the engine speed Ne indicative of the input rotational speed of the torque converter 60, the turbine rotational speed Nt indicative of the output rotation speed of the torque converter 60, the throttle opening degree θth, the vehicle speed V, and the input torque, and other parts to adjust the pressure of a lock-up relay valve and a lock-up control valve not shown in the drawings to control the lock-up clutch 67. The on-off solenoid valve SL is adapted to perform the changing operation of the hydraulic pressure of the lock-up relay valve.

The linear solenoid valves SL1 to SL5 serve to perform the speed change control. The linear solenoid valves SL1 and SL2 function to hydraulically control the C1 clutch 75 and the C2 clutch 76. The linear solenoid valves SL3, SL4 and SL5 are designed to hydraulically control the B1 brake 77, the B2 brake 78, and the B3 brake 79.

The constructions of the front differential mechanism 14 and the transfer 16 in the present embodiment will be explained hereinafter with reference to the schematic block diagram shown in FIG. 5.

Figure 5:
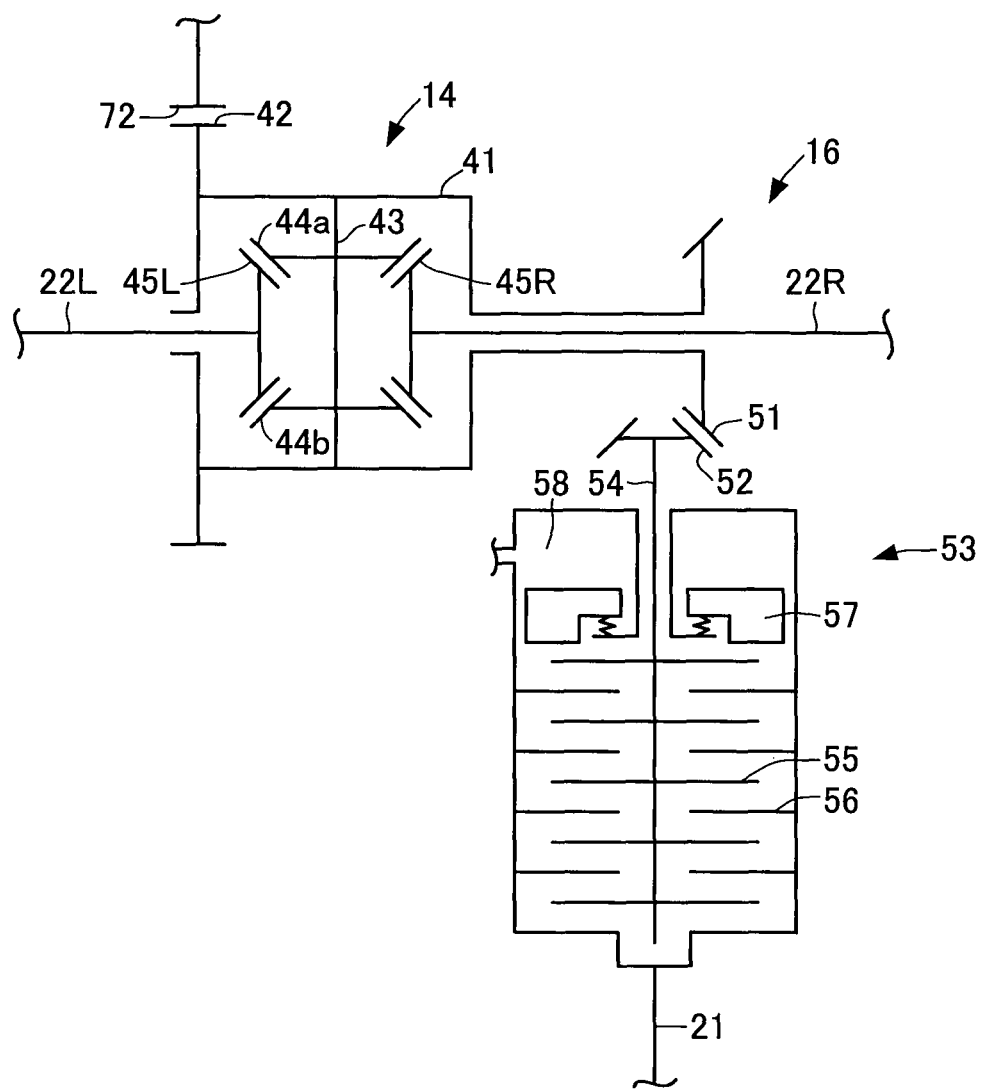
FIG. 5 is a schematic block diagram representing the construction of a front differential mechanism and a transfer in the embodiment of the present invention.

As shown in FIG. 5, the front differential mechanism 14 comprises a hollow differential case 41, a differential ring gear 42 provided on the outer peripheral portion of the differential case 41, a pinion shaft 43 provided in the differential case 41, differential pinion gears 44a, 44b, and side gears 45L, 45R. Further, the differential pinion gears 44a, 44b, and the side gears 45L, 45R are each constituted by a bevel gear.

The differential case 41 is rotatably supported on and around the front drive shafts 22L, 22R. The differential ring gear 42 is provided on the outer peripheral portion of the differential case 41 in meshing engagement with the output gear 72 of the automatic transmission 13. The pinion shaft 43 is in parallel with the differential ring gear 42 and secured to the differential case 41, so that the pinion shaft 43 can be rotated integrally with the differential case 41.

The differential pinion gears 44a, 44b are rotatably supported on and around the pinion shaft 43. The side gear 45L is rotatably mounted on and rotated integrally with the front drive shaft 22L, and is held in meshing engagement with the differential pinion gear 44a, and the differential pinion gear 44b. In a similar manner, the side gear 45R is rotated integrally with the front drive shaft 22R, and is in meshing engagement with the differential pinion gear 44a and the differential pinion gear 44b.

It is thus to be noted that the front differential mechanism 14 is constructed to have the side gear 45L and the side gear 44R rotated together while the differential pinion gear 44a and the differential pinion gear 44b are not rotated. On the other hand, when the differential pinion gears 44a, 44b of the front differential mechanism 14 are rotated, the side gear 45L and the side gear 45R are relatively rotated in their opposite directions. It is therefore understood that the front differential mechanism 14 is constructed to allow the rotation number difference between the side gear 45L integrally rotated with the front drive shaft 22L and the side gear 45R integrally rotated with the front drive shaft 22R to be generated, thereby making it possible to absorb the rotation number difference between the front wheel 17L and the front wheel 17R when the vehicle is travelling on a curved road.

The rear differential mechanism 15 is the same in construction as the front differential mechanism 14, and thus will not be explained hereinafter. The rear differential mechanism 15 is constructed to have the differential ring gear 42 held in mesh with the pinion gear of the propeller shaft 21 in place of the output gear 72 of the automatic transmission 13. The rear differential mechanism 15 is further constructed to have the left and right side gears rotated integrally with the rear drive shafts 23L, 23R in lieu of the front drive shafts 22L, 22R.

The transfer 16 comprises a hypoid gear 51, a hypoid pinion 52, and the transfer clutch 53.

The hypoid gear 51 is integrally rotated with the differential case 41 of the front differential mechanism 14 to input the torque to the transfer 16 from the automatic transmission 13 through the front differential mechanism 14. The hypoid pinion 51 and the hypoid gear 52 are each constituted by a gear such as for example a bevel gear to change the rotational direction of the torque at an angle of 90 degrees when the torque inputted from the hypoid gear 51 is transmitted to the hypoid gear 52.

The transfer clutch 53 comprises the input shaft 54, multi-plate clutch discs 55, multi-plate clutch plates 56, and a piston 57, and is formed therein with a hydraulic servo chamber 58. The transfer clutch 53 is constructed to have the hypoid pinion 52 and the propeller shaft 21 connected to make it possible for the torque to be transmitted between the hypoid pinion 52 and the propeller shaft 21. The transfer clutch 53 itself is constructed by a known wet multi-plate clutch of a hydraulic servo type.

The input shaft 54 is drivably connected with the hypoid pinion 52 to be inputted with the torque from the hypoid pinion 52 and to output the torque to the multi-plate clutch discs 55. The multi-plate clutch plates 56 are constructed to transmit the torque to the propeller shaft 21. The multi-clutch discs 55 and the multi-plate clutch plates 56 collectively constitute a multi-plate clutch.

The hydraulic pressure in the hydraulic servo chamber 58 is controlled by the hydraulic control device, so that the hydraulic pressure fed into the hydraulic servo chamber 58 can cause the multi-plate clutch discs 55 and the multi-plate clutch plates 56 to be pressed at a predetermined pressure, thereby securing a predetermined amount of torque transmission therebetween by the predetermined pressure.

The transfer 16 is constructed to distribute the driving force of the engine 12 to the front wheels 17L, 17R and the rear wheels 18L, 18R as understood from the previous description. This means that the transfer 16 constitutes a driving force distribution device.

The following description will be directed to the determination method of a bad road travelling by the ECU 100 of the vehicle 10 according to the present embodiment.

For example, the ECU 100 is adapted to determine whether or not the vehicle 10 is currently travelling on a bad road in accordance with the torque distribution of the transfer 16. More specifically, the ECU 100 is adapted to determine whether or not the vehicle 10 is currently travelling on a bad road in accordance with an input-output rotational speed ratio of the rotational speed TRin of the input shaft of the transfer 16 detected by the transfer input speed sensor 163 and the rotational speed TRout of the output shaft of the transfer 16 detected by the transfer output speed sensor 164 or the changed state of the power changing switch 215 of the transfer 16 detected by the distribution SW sensor 165.

The ECU 100 determines whether or not the vehicle 10 is travelling on a bad road in accordance with the travel mode selected by the driver. Further, the ECU 100 may determine whether or not the vehicle 10 is travelling on a bad road in accordance with the tilt angle of the vehicle 10 detected by the tilt sensor 166, the time variation in the tilt angle of the vehicle 10, i.e., the rocking motion detected by the tilt sensor 166, the position of the driver's seat detected by the seat position sensor 167, or a difference between the driver's seat position thus detected and the position of the driver's seat stored in advance in the EEPROM. Further, the ECU 100 can determine whether or not the vehicle 10 is travelling on a bad road in accordance with the topographical information of the current position acquired by the navigation system 170.

The ECU 100 is designed to use one of or a combination of the bad road travelling determination methods appearing in the foregoing description for determining whether or not the vehicle 10 is travelling on a bad road.

The characteristic construction of the ECU 100 of the vehicle 10 in the embodiment according to the present invention will be explained hereinafter.

The ECU 100 is adapted to execute the reduction control of reducing the torque outputted from the engine 12 with respect to the torque requested amount. Further, the ECU 100 is adapted to execute the reduction control of the engine torque with the control permission condition being determined to be established, and to terminate the reduction control of the engine torque with the control termination condition being determined to be established. On the other hand, the ECU 100 is adapted not to execute the reduction control of the engine torque with the control permission condition being determined to be not established.

The ECU 100 is adapted to execute the reduction control of the engine torque when the front wheel speed sensor 161 detects the vehicle speed V exceeding the predetermined set vehicle speed. Further, the ECU 100 is adapted to execute the reduction control of the engine torque when the control permission condition is determined to be established as continuing for a predetermined time period. This means that the ECU 100 constitutes an output control means.

The ECU 100 is adapted to determine whether or not the control permission condition to permit the execution of the reduction control of the engine torque is established. The ECU 100 is adapted to determine that the control permission condition is established when the depression of the accelerator pedal 212 being detected by the accelerator sensor 142 and the depression of the foot brake pedal 213 being detected by the FB sensor 143. Further, the ECU 100 is adapted to determine that the control permission condition is not established when the vehicle is determined to be travelling on a bad road.

Further, the ECU 100 is adapted to determine that the control permission condition is established when the depression of the foot brake pedal 213 is detected by the FB sensor 143 in the state that the depression of the accelerator pedal 212 is detected by the accelerator sensor 142. This means that the ECU 100 constitutes a control permission condition determination means.

Further, the ECU 100 is adapted to determine whether or not the control termination condition to terminate the reduction control of the engine torque is established. Further, the ECU 100 is adapted to determine that the control termination condition to terminate the reduction control of the engine torque is established when estimating that the driver has a travel intention to travel the vehicle. Further, the ECU 100 is adapted to determine that the control termination condition is established when the depression amount of the accelerator pedal 212 detected by the accelerator sensor 142 is decreased over the set change amount of accelerator opening degree from the starting time accelerator opening degree. This means that the ECU 100 constitutes a control termination condition determination means.

Further, the ECU 100 is adapted to estimate whether or not the driver has a travel intention to travel the vehicle based on the drive state detected by various sensors during the execution of the reduction control. Further, the ECU 100 is adapted to estimate whether or not the driver has the travel intention based on the variation of the depression amount of the accelerator pedal 212 detected by the accelerator sensor 142 or the depression amount of the foot brake pedal 213 detected by the FB sensor 143.

Further, the ECU 100 is adapted to estimate that the driver has the travel intention when the depression amount of the accelerator pedal 212 detected by the accelerator sensor 142 is varied to exceed a set change amount of accelerator opening degree as compared with the starting time accelerator opening degree. For example, the ECU 100 estimates that the driver has the travel intention when the depression amount of the accelerator pedal 212 detected by the accelerator sensor 142 is increased to exceed a set change amount of accelerator opening degree from the starting time accelerator opening degree. Further, the ECU 100 is adapted to estimate that the driver has the travel intention when the time period lasts over a predetermined time with the depression amount of the accelerator pedal 212 detected by the accelerator sensor 142 being varied over the set change amount of accelerator opening degree as compared with the starting time accelerator opening degree. Further, the ECU 100 is adapted to estimate that the driver has the travel intention when the FB sensor 143 detects that the foot brake pedal 213 is not depressed. This means that the ECU 100 constitutes a travel intention estimation means.

Further, the ECU 100 is adapted to memorize the depression amount of the accelerator pedal 212 as a starting time accelerator opening degree when the reduction control of the engine torque starts to be executed. This means that the ECU 100 constitutes an accelerator opening degree memorization means.

Further, the ECU 100 is adapted to determine whether or not the vehicle is travelling on a bad road based on the drive state detected by the sensors 131 to 167. This means that the ECU 100 constitutes a bad road travel determination means.

Next, the operation of the vehicle control process in the present embodiment will be explained hereinafter with reference to the flow chart shown in FIG. 6.

The flow chart shown in FIG. 6 is indicative of the execution content of the program of the vehicle control process to be executed by the CPU of the ECU 100 with the RAM as a work area. The program of the vehicle control process is stored in the ROM of the ECU 100. The vehicle control process is executed by the CPU of the ECU 100 at a time interval defined in advance.

As shown in FIG. 6, the ECU 100 is initially operated to determine whether or not the vehicle is travelling on a bad road (Step S11). One or more determination methods in combination on whether or not the vehicle is travelling on a bad road appearing in the foregoing description are carried out by the ECU 100.

The ECU 100 finishes the vehicle control process to prevent the drivability from being deteriorated as a result of hesitation and others generated by the reduced torque of the engine 12 when the vehicle is determined by the ECU 100 to be travelling on a bad road ("YES" in Step S11).

When, on the other hand, the vehicle is determined by the ECU 100 to be not travelling on a bad road ("NO" in Step S11), the ECU 100 then determines whether or not the accelerator is "on" and finishes the vehicle control process if the accelerator is not "on" (Step S12). More specifically, the ECU 100 determines whether or not the accelerator opening degree Acc detected by the accelerator sensor 142 exceeds the accelerator pedal depression determination value Acc_tv stored in the ROM. When the ECU 100 determines that the accelerator opening degree Acc exceeds the accelerator pedal depression determination value Acc_tv, the ECU 100 determines that the accelerator pedal 212 is depressed, viz., the accelerator is "on". When, on the other hand, the ECU 100 determines that the accelerator opening degree Acc is less than the accelerator pedal depression determination value Acc_tv, the ECU 100 determines that the accelerator pedal 212 is not depressed, viz., the accelerator is "off".

When the ECU 100 determines that the accelerator is "on" ("YES" in Step S12), the ECU 100 then determines whether or not the brake is "on", and finishes the vehicle control process if the brake is not "on" (Step S13). More specifically, the ECU 100 determines whether or not the brake pedal depression force Bf detected by the FB sensor 143 exceeds the brake pedal depression determination value Bf_tv stored in the ROM. When the ECU 100 determines that the brake pedal depression force Bf detected by the FB sensor 143 exceeds the brake pedal depression determination value Bf_tv, the ECU 100 determines that the foot brake pedal 213 is depressed, viz., the brake is "on". When, on the other hand, the ECU 100 determines that the brake pedal depression force Bf is less than the brake pedal depression determination value Bf_tv, the ECU 100 determines that the foot brake pedal 213 is not depressed, viz., the brake is "off".

The ECU 100 transfers the current brake information stored in the RAM to the previous brake information at the time of the brake-on determination process (Step S13), and stores the determined brake information into the RAM as the current brake information. Here, the brake information is indicative of the state of the brake, i.e., brake-on and brake-off. When the accelerator is "on" ("YES" in Step S12) and the brake is "on" ("YES" in Step S13), the ECU 100 starts to operate a timer and monitors the lasting time interval of the state in which the accelerator and the brake are concurrently depressed.

When the ECU 100 determines that the brake is "on" ("YES" in Step S13), the ECU 100 then determines whether or not the previous brake state is "off", and finishes the vehicle control process (Step S14) if the previous brake state is not "off". More specifically, the ECU 100 reads the previous brake information stored in the RAM, and determines whether or not the brake state is "off".

By the accelerator-on determination process (Step S12), the brake-on determination process (Step S13), and the previous brake-off determination process (Step S14), it can be determined that the foot brake pedal 213 is depressed later in the state that the accelerator pedal 212 is being depressed.

When the ECU 100 determines that the previous brake state is "off" ("YES" in Step S14), the ECU 100 then performs the speed reduction determination, and finishes the vehicle control process (Step S15) if the vehicle 10 is not in speed reduction. More specifically, the ECU 100 determines whether or not the vehicle speed V calculated from the rotational speed detected by the front wheel speed sensor 161 is decreased to exceed the predetermined amount. When the vehicle speed V is decreased to exceed the predetermined amount, the ECU determines that the vehicle 10 is travelling in the reduced speed state. When, on the other hand, the vehicle speed V is not decreased to exceed the predetermined amount, the ECU determines that the vehicle 10 is not travelling in the reduced speed state. It is preferable that the predetermined amount for determining the above reduced speed be a value responsive to the vehicle speed while may be a constant value.

Further, the previously mentioned vehicle speed reduction determination is in principle processed while the vehicle 10 is travelling on a normal road not like the bad road, and thus does not cause any problem. The following process of the vehicle speed reduction determination may be considered to be applicable to the vehicle 10 travelling on the bad road.

For example, the ECU 100 determines whether or not the brake pedal depression force Bf detected by the FB sensor 143 exceeds the brake determination value BfDc_tv memorized in the ROM. When the ECU 100 determines that the brake pedal depression force Bf exceeds the brake determination value Mc tv, the ECU 100 determines that the vehicle 10 is travelling in the reduced speed state. When, on the other hand, the ECU 100 determines that the brake pedal depression force Bf does not exceed the brake determination value BfDc_tv, the ECU 100 determines that the vehicle 10 is not travelling in the reduced speed state.

Further, in the state that the transfer 16 is operated under the two-wheel drive mode, the ECU 100 can carry out the speed reduction determination in such a manner that the vehicle body speed Vr is obtained by the ECU 100 from the rotational speed detected by the rear wheel speed sensor 162 for detecting the rotational speed of the rear wheels 18L, 18R each serving as a rolling wheel, so that the ECU 100 can determine the speed reduction by the varied amount of the vehicle body speed Vr. In the case that the vehicle is constituted by a two-wheel drive vehicle, the vehicle is generally provided with no transfer 16, and thus is driven by the rear wheels 18L, 18R or the front wheels 17L, 17R each serving as a drive wheel, so that the vehicle body speed Vr can be obtained by the rear wheel speed sensor 162 or the front wheel speed sensor 161, thereby making it possible to apply the previously mentioned speed reduction determination.

The vehicle 10 is provided with an accelerator sensor for detecting the acceleration of the vehicle 10. The ECU 100 may determine the speed reduction by the acceleration of the vehicle 10 detected by the accelerator sensor.

When the ECU 100 determines the speed reduction ("YES" in Step S15), the ECU 100 determines whether or not the state of the accelerator pedal and the brake pedal being concurrently depressed continues for less than 10 seconds. When the ECU 100 determines that the state of the accelerator pedal and the brake pedal being concurrently depressed continues for 10 or more seconds, the ECU 100 finishes the vehicle control process (Step S16). Here, the reason why the vehicle control process is finished when the state of the accelerator pedal and the brake pedal being concurrently depressed continues for 10 or more seconds is due to the fact that the ECU 100 cannot definitely determine whether or not the torque of the engine 12 should be decreased when the accelerator pedal 212 and the foot brake pedal 213 are always concurrently depressed.

When the ECU 100 determines that the state of the accelerator pedal and the brake pedal being concurrently depressed continues for less than 10 seconds ("YES" in Step S16), the ECU 100 then determines whether or not the control permission condition (Step S11 to Step S16) continues for a predetermined period of time, and determines whether the vehicle speed V exceeds or does not exceed 7 (km/h), and finishes the vehicle control process (Step S17) if the control permission condition established is not continuing for the predetermined period of time or if the vehicle speed is less than 7 (km/h) (Step S17). Here, the detection value to be used for the vehicle speed determination is preferably the vehicle body speed Vr as previously mentioned.

When the ECU 100 determines that the control permission condition is continued for the predetermined period of time and the vehicle speed exceeds 7 (km/h) ("YES" in Step S17), the ECU 100 performs the reduction control of the output torque of the engine 12 (Step S18). For example, the ECU 100 rewrites the accelerator opening degree value from the actual accelerator opening degree Acc (drive force desired value) to the output reducing accelerator opening degree Acn for use in the output reduction to reduce the torque of the engine 12 stored in the ROM, thereby making it possible to have the torque decreased to a level lower than the engine torque outputted by the actual accelerator opening degree Acc. Here, the reduction speed of the engine torque, viz., the changing rate from the actual accelerator opening degree Acc to the output reducing accelerator opening degree Acn is set to the rate corresponding to the vehicle speed V, thereby making it possible to make the time it takes to reach the desired decreased engine torque equal.

Then, the ECU 100 determines whether or not the termination condition of the reduction control process of the engine torque is established (Step S19). More specifically, the ECU 100 determines whether or not the brake is "off" or the state of the hysteresis width of the accelerator opening degree exceeding a predetermined hysteresis width being continued for a predetermined period of time. When the ECU 100 determines that the brake is "on" and the hysteresis width of the accelerator opening degree is less than the predetermined hysteresis width, or a predetermined period of time has not elapsed even if the hysteresis width of the accelerator opening exceeds the predetermined hysteresis width, the ECU 100 returns to the reduction control process of the engine torque (Step S18). Here, the hysteresis width of the accelerator opening degree indicates the difference between the actual accelerator opening degree Acc before the reduction control process of the engine torque (Step S18) and the current actual accelerator opening degree Acc detected by the accelerator sensor 142. The previous predetermined hysteresis width is for example about +/−10 degrees.

As previously mentioned, the reduction control of the engine torque is designed to be finished when the hysteresis width of the accelerator opening exceeds the predetermined hysteresis width. More specifically, the state that the hysteresis width of the accelerator opening is increased to exceed the predetermined hysteresis width is considered as the driver having the travel intention and as the accelerator pedal 212 being depressed, thereby terminating the reduction control. On the other hand, when the hysteresis width of the accelerator opening is decreased to exceed the predetermined hysteresis width, the driver has the travel intention, and additionally the engine torque is decreased even with the control of the engine 12 in response to the actual accelerator opening degree. This makes it unnecessary to execute the control to reduce the engine torque, so that the reduction control is finished. The fact that the continuing time of the state that the hysteresis width of the accelerator opening exceeds the predetermined hysteresis width is contained in the determination process makes it possible to enhance the certainty and reliability of the determination by the ECU 100 by excluding the case that the driver temporally has depressed and released the accelerator pedal 212 without his or her consciousness.

When the ECU 100 determines that the termination condition of the reduction control process of the engine torque is established, viz., the brake is "off", or the state of the hysteresis width of the accelerator opening degree exceeding the predetermined hysteresis width continues for a predetermined period of time ("YES" in Step S19), the ECU 100 performs the torque returning process of the engine 12, and finishes the vehicle control process (Step S20). For example, when the ECU 100 uses the accelerator opening degree rewritten in the reduction control process of the engine torque (Step S18), the accelerator opening degree is returned to the actual accelerator opening degree Acc detected by the accelerator sensor 142 to return the torque of the engine 12 to the torque at the time of usual vehicle travel.

As has been explained in the above, the vehicle control apparatus in the present embodiment is constructed in such a manner that when the depressions of the accelerator pedal 212 and the foot brake pedal 213 are detected, the torque reduction of the engine 12 is performed, and when the depression amount of the accelerator pedal 212 and the depression amount of the foot brake pedal 213 are varied while the torque reduction of the engine 12 is being performed, it is possible to change the execution and no-execution of the reduction control with the consciousness of the driver by finishing the reduction control of the engine torque, and thus to prevent the drivability from being deteriorated.

Further, the vehicle control apparatus in the present embodiment is constructed in such a manner that when the depression amount of the accelerator pedal 212 is varied to exceed the set change amount of accelerator opening degree with respect to the depression amount of the accelerator pedal 212 at the time of starting the execution of the reduction control, it is estimated that the driver has the travel intention. This makes it possible to prevent the reduction control from abruptly being finished to the depression amount of the accelerator pedal 212 varied without his or her intention.

Further, the vehicle control apparatus in the present embodiment is constructed in such a manner that when the depression amount of the accelerator pedal 212 is increased to exceed the set change amount of accelerator opening degree from the starting time accelerator opening, it is estimated that the driver has the travel intention. This makes it possible to rapidly finish the reduction control when the driver depresses the accelerator pedal 212 and thus to prevent the drivability from being deteriorated.

Further, the vehicle control apparatus in the present embodiment is constructed in such a manner that when the depression amount of the accelerator pedal 212 is decreased to exceed the set change amount of accelerator opening degree from the starting time accelerator opening, it is determined that the driver has the travel intention. This makes it possible to rapidly finish reduction control, viz., the unnecessary reduction control when the driver releases and thus returns the accelerator pedal 212 to its home position and thus to prevent the drivability from being deteriorated.

Further, the vehicle control apparatus in the present embodiment is constructed in such a manner that when the depression amount of the accelerator pedal 212 is varied to exceed the set change amount of accelerator opening degree as compared with the starting time accelerator opening, and the depressed state of the accelerator pedal 212 lasts for a time period more than the set time period, it is determined that the driver has the travel intention. This makes it possible to improve the certainty of the driver's consciousness with the lasting depressed state, i.e., the lasting depressed time of the accelerator pedal 212, and to prevent the reduction control from being rapidly finished with respect to the depression amount of the accelerator pedal 212 varied without the driver's consciousness, and thus to prevent the drivability from being deteriorated.

Further, the vehicle control apparatus in the present embodiment is constructed to estimate that the driver has the travel intention when detecting the foot brake pedal 213 not being depressed. This makes it possible to rapidly finish reduction control and to output the desired torque when the foot brake pedal 213 is released from being depressed, and thus to prevent the drivability from being deteriorated.

Further, the vehicle control apparatus according to the present embodiment is constructed not to allow the reduction control to be executed in the case of the vehicle being determined to travel on a bad road, so that the vehicle can travel without decreasing the torque outputted from the engine 12 even if the accelerator pedal 212 and the foot brake pedal 213 are concurrently depressed while the vehicle is travelling on a bad road having a high possibility of the accelerator pedal 212 and the foot brake pedal 213 being concurrently depressed intentionally. Therefore, at the time of the vehicle being travelling on a normal road, the torque from the engine 12 can be decreased in the case that the accelerator pedal 212 and the foot brake pedal 213 are concurrently depressed by the driver, while, at the time of the vehicle being travelling on a bad road, the torque requested by the driver is generated by the engine 12, thereby making it possible to prevent the drivability from being deteriorated.

The case of the foot brake pedal 213 being depressed after the accelerator pedal 212 is being depressed is generally indicative of the vehicle travel state in which the driver is requesting the braking of the vehicle 10. In this case, the vehicle control apparatus according to the present embodiment can decrease the torque outputted from the engine 12 when detecting the depression of the foot brake pedal 213 in the state of the accelerator pedal 212 being depressed.

Further, the vehicle control apparatus according to the present embodiment is constructed to perform the driving force reduction control when the vehicle speed V exceeds the preliminarily set vehicle speed, while the driving force reduction control is not executed in order to respond the hill start and others of the vehicle 10. This makes it possible to prevent the drivability from being deteriorated while the necessary torque is transmitted.

Further, the vehicle control apparatus according to the present embodiment is constructed to perform the reduction control when the control permission condition is being established for a preliminarily set lasting time period, so that the reduction control can be prevented from excessively being performed, thereby making it possible to prevent the drivability from being deteriorated.

Although the previously mentioned embodiment has been explained about the vehicle 10 with an engine 12 working as a drive source using gasoline as one of fuels, the present invention does not limit such the vehicle 10 with the engine 12, but can be applied to an electric automotive vehicle having one or more motors as drive sources, a hydrogen automotive vehicle having a drive source of an engine using hydrogen as one of fuels, and a hybrid vehicle using an engine and a motor as a drive source. In this case, the drive source to decrease the torque includes not only the engine 12 but also the motor the drive force of which can be decreased.

Although the previously mentioned embodiment having only one ECU has been explained, the vehicle control apparatus may be constructed with a plurality of ECUs according to the present invention. For example, the ECU 100 of the present embodiment may be constructed by a plurality of ECUs such as an E-ECU for executing the combustion control of the engine 12, and a T-ECU for executing the transmission control of the automatic transmission 13. In this case, each of the above ECUs can communicate necessary information with one another.

As will be understood from the foregoing description, the vehicle control apparatus according to the present invention can allow the execution and non-execution of the reduction control to be switched therebetween in accordance with the driver's travel intention, and has an advantageous effect to prevent the drivability from being deteriorated. For this reason, the vehicle control apparatus according to the present invention is useful as a vehicle control apparatus to perform the reduction control of the output of the drive source.

REFERENCE SIGNS LIST

10: vehicle
12: engine (drive source)
13: automatic transmission
14: front differential mechanism
15: rear differential mechanism
16: transfer
17L, 17R: front wheel
18L, 18R: rear wheel
21: propeller shaft
22L, 22R: front drive shaft
23L, 23R: rear drive shaft
41: differential case
51: hypoid gear
52: hypoid pinion
53: transfer clutch
54: input shaft
100: ECU (output control means, permission condition determination means, speed reduction determination means, bad road travel determination means)
110: hydraulic control device
120: operation panel
131: crank sensor
142: accelerator sensor (drive state detection means, accelerator detection means)

143: FB sensor (drive state detection means, brake detection means)
145: throttle sensor
146: acceleration sensor (drive state detection means, acceleration detection means)
161: front wheel speed sensor (drive state detection means, vehicle speed detection means, wheel rotational speed detection means)
162: rear wheel speed sensor (drive state detection means, wheel rotational speed detection means, rolling wheel rotational speed detection means)
163: transfer input speed sensor
164: transfer output speed sensor
165: distribution SW sensor
166: tilt sensor
167: seat position sensor
170: navigation system
212: accelerator pedal
213: foot brake pedal
215: power changing switch

The invention claimed is:

1. A vehicle control apparatus for a vehicle provided with a drive source, an accelerator pedal, and a brake pedal, comprising:
a drive state detection means for detecting a drive state of the vehicle including a drive force requested amount of a drive force outputted by the drive source;
an output control means for executing a reduction control to reduce the drive force outputted by the drive source for the drive force requested amount;
a permission condition determination means for determining whether or not a permission condition to permit execution of the reduction control is established;
a termination condition determination means for determining whether or not a termination condition to terminate the execution of the reduction control is established;
a travel intention estimation means for estimating whether or not a driver has a travel intention based on the drive state of the vehicle detected by the drive state detection means during the execution of the reduction control; and
an accelerator opening degree memorization means for memorizing as a starting time accelerator opening degree the depression amount of the accelerator pedal when the reduction control starts to be executed by the output control means, wherein
the drive state detection means has an accelerator detection means for detecting a depression amount of the accelerator pedal, and a brake detection means for detecting depression of the brake pedal,
the permission condition determination means is operative to determine the establishment of the control permission condition when the depression of the accelerator pedal is detected by the accelerator detection means, and the depression of the brake pedal is detected by the brake detection means,
the travel intention estimation means is operative to estimate whether or not the driver has a travel intention to travel the vehicle based on the depression amount of the accelerator pedal or the varied depression of the brake pedal detected by the drive state detection means,
the termination condition determination means is operative to determine the establishment of the control termination condition when the travel intention estimation means estimates that the driver has the travel intention,
the output control means is operative to execute the reduction control when the establishment of the control permission condition is determined by the permission condition determination means, and to terminate the reduction control when the establishment of the control termination condition is determined by the termination condition determination means, and
the travel intention estimation means is operative to estimate that the driver has the travel intention when the depression amount of the accelerator pedal detected by the accelerator detection means is varied to exceed a set change amount of accelerator opening degree as compared with the starting time accelerator opening degree.

2. A vehicle control apparatus as set forth in claim 1, wherein the travel intension estimation means is operative to estimate that the driver has the travel intention when the depression amount of the accelerator pedal detected by the accelerator detection means is increased over the set change amount of accelerator opening degree from the starting time accelerator opening degree.

3. A vehicle control apparatus as set forth in claim 1, wherein the termination condition determination means is operative to determine that the control termination condition is established when the depression amount of the accelerator pedal detected by the accelerator detection means is decreased over the set change amount of accelerator opening degree from the starting time accelerator opening degree.

4. A vehicle control apparatus as set forth in claim 1, wherein the travel intension estimation means is operative to estimate that the driver has the travel intention when the time period lasts over a predetermined time with the depression amount of the accelerator pedal detected by the accelerator detection means being varied over the set change amount of accelerator opening degree as compared with the starting time accelerator opening degree.

5. A vehicle control apparatus as set forth in claim 1, wherein the travel intension estimation means is operative to estimate that the driver has the travel intention when the brake pedal not depressed is detected by the brake detection means.

6. A vehicle control apparatus as set forth in claim 1, further comprising:
a bad road travel determination means for determining whether or not the vehicle is traveling on bad roads based on the drive state detected by the drive state detection means, wherein
the permission condition determination means is operative to determine that the control permission condition is not established when the bad road travel determination means determines that the vehicle is traveling on the bad roads, and the output control means is operative not to execute the reduction control when the permission condition determination means determines that the control permission condition is not established.

7. A vehicle control apparatus as set forth in claim 1, wherein the permission condition determination means is operative to determine that the control permission condition is established when the depression of the brake pedal is detected by the brake detection means in the state that the depression of the accelerator pedal is detected by the accelerator detection means.

8. A vehicle control apparatus as set forth in claim 1, wherein the drive state detection means has a vehicle speed detection means for detecting a vehicle speed, and the output control means is operative to execute the reduction control when the vehicle speed detection means detects that the detected vehicle speed is over a predetermined vehicle speed.

9. A vehicle control apparatus as set forth in claim 1, wherein the output control means is operative to execute the reduction control when the permission condition determination means determines that the control permission condition lasting in a preliminarily set time period is established.

10. A vehicle control apparatus for a vehicle provided with a drive source, an accelerator pedal, and a brake pedal, comprising:
  a drive state detector that detects a drive state of the vehicle including a drive force requested amount of a drive force outputted by the drive source;
  an output control portion that executes a reduction control to reduce the drive force outputted by the drive source for the drive force requested amount;
  a permission condition determination portion that determines whether or not a permission condition to permit execution of the reduction control is established;
  a termination condition determination portion that determines whether or not a termination condition to terminate the execution of the reduction control is established;
  a travel intention estimation portion that estimates whether or not a driver has a travel intention based on the drive state of the vehicle detected by the drive state detector during the execution of the reduction control; and
  an accelerator opening degree memorization portion that memorizes as a starting time accelerator opening degree the depression amount of the accelerator pedal when the reduction control starts to be executed by the output control portion, wherein
  the drive state detector has an accelerator detector that detects a depression amount of the accelerator pedal, and a brake detector that detects depression of the brake pedal,
  the permission condition determination portion is operative to determine the establishment of the control permission condition when the depression of the accelerator pedal is detected by the accelerator detector, and the depression of the brake pedal is detected by the brake detector,
  the travel intention estimation portion is operative to estimate whether or not the driver has a travel intention to travel the vehicle based on the depression amount of the accelerator pedal or the varied depression of the brake pedal detected by the drive state detector,
  the termination condition determination portion is operative to determine the establishment of the control termination condition when the travel intention estimation portion estimates that the driver has the travel intention,
  the output control portion is operative to execute the reduction control when the establishment of the control permission condition is determined by the permission condition determination portion, and to terminate the reduction control when the establishment of the control termination condition is determined by the termination condition determination portion, and
  the travel intention estimation portion is operative to estimate that the driver has the travel intention when the depression amount of the accelerator pedal detected by the accelerator detector is varied to exceed a set change amount of accelerator opening degree as compared with the starting time accelerator opening degree.

11. A vehicle control apparatus as set forth in claim 10, wherein the travel intension estimation portion is operative to estimate that the driver has the travel intention when the depression amount of the accelerator pedal detected by the accelerator detector is increased over the set change amount of accelerator opening degree from the starting time accelerator opening degree.

12. A vehicle control apparatus as set forth in claim 10, wherein the termination condition determination portion is operative to determine that the control termination condition is established when the depression amount of the accelerator pedal detected by the accelerator detector is decreased over the set change amount of accelerator opening degree from the starting time accelerator opening degree.

13. A vehicle control apparatus as set forth in claim 10, wherein the travel intension estimation portion is operative to estimate that the driver has the travel intention when the time period lasts over a predetermined time with the depression amount of the accelerator pedal detected by the accelerator detector being increased over the set change amount of accelerator opening degree as compared with the starting time accelerator opening degree.

14. A vehicle control apparatus as set forth in claim 10, wherein the travel intension estimation portion is operative to estimate that the driver has the travel intention when the brake pedal not depressed is detected by the brake detector.

15. A vehicle control apparatus as set forth in claim 10, further comprising:
  a bad road travel determination portion that determines whether or not the vehicle is traveling on bad roads based on the drive state detected by the drive state detector, wherein
  the permission condition determination portion is operative to determine that the control permission condition is not established when the bad road travel determination portion determines that the vehicle is traveling on the bad roads, and the output control portion is operative not to execute the reduction control when the permission condition determination portion determines that the control permission condition is not established.

16. A vehicle control apparatus as set forth in claim 10, wherein the permission condition determination portion is operative to determine that the control permission condition is established when the depression of the brake pedal is detected by the brake detector in the state that the depression of the accelerator pedal is detected by the accelerator detector.

17. A vehicle control apparatus as set forth in claim 10, wherein the drive state detector has a vehicle speed detector that detects a vehicle speed, and the output control portion is operative to execute the reduction control when the vehicle speed detector detects that the detected vehicle speed is over a predetermined vehicle speed.

18. A vehicle control apparatus as set forth in claim 10, wherein the output control portion is operative to execute the reduction control when the permission condition determination portion determines that the control permission condition lasting in a preliminarily set time period is established.

* * * * *